Patented July 5, 1927.

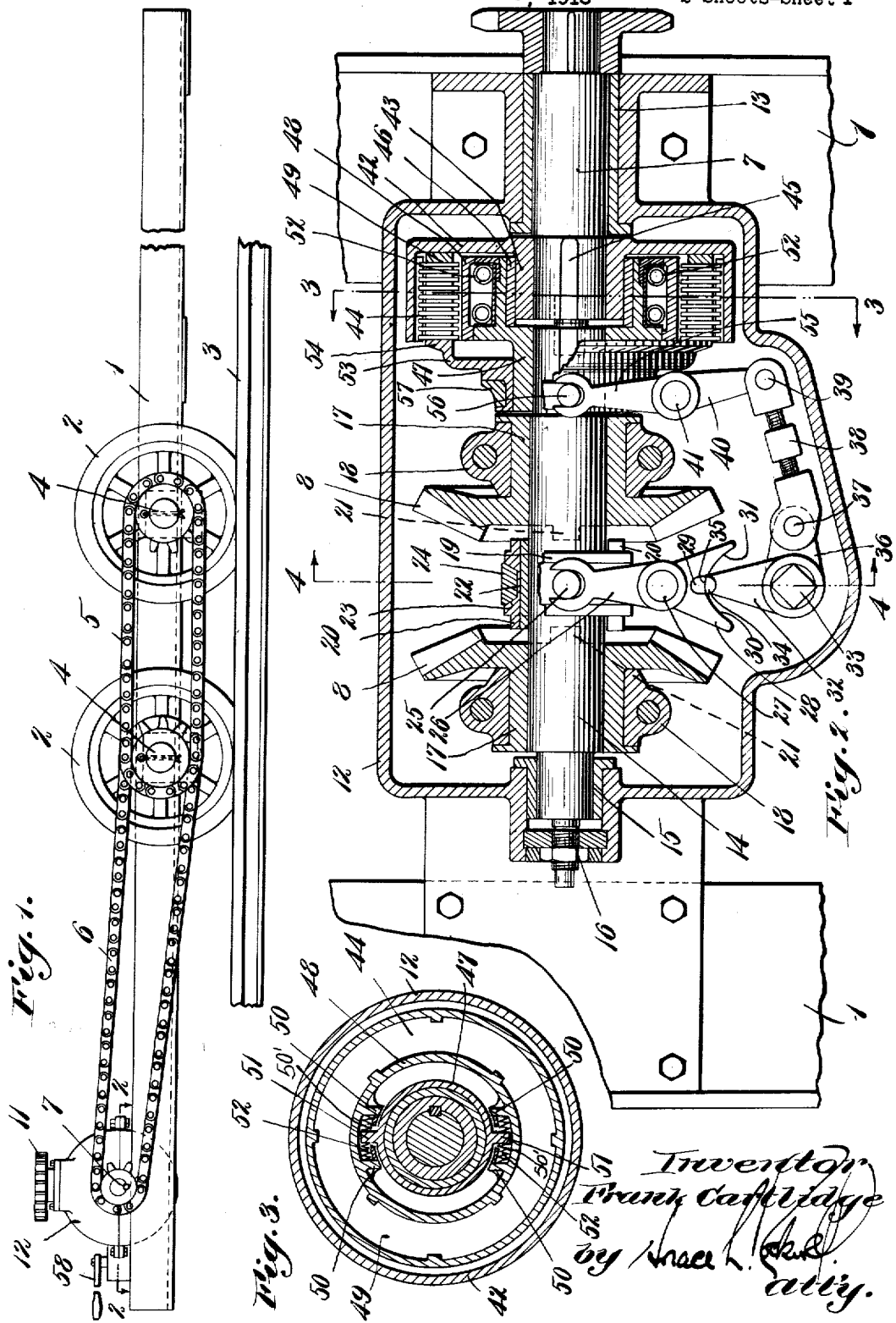

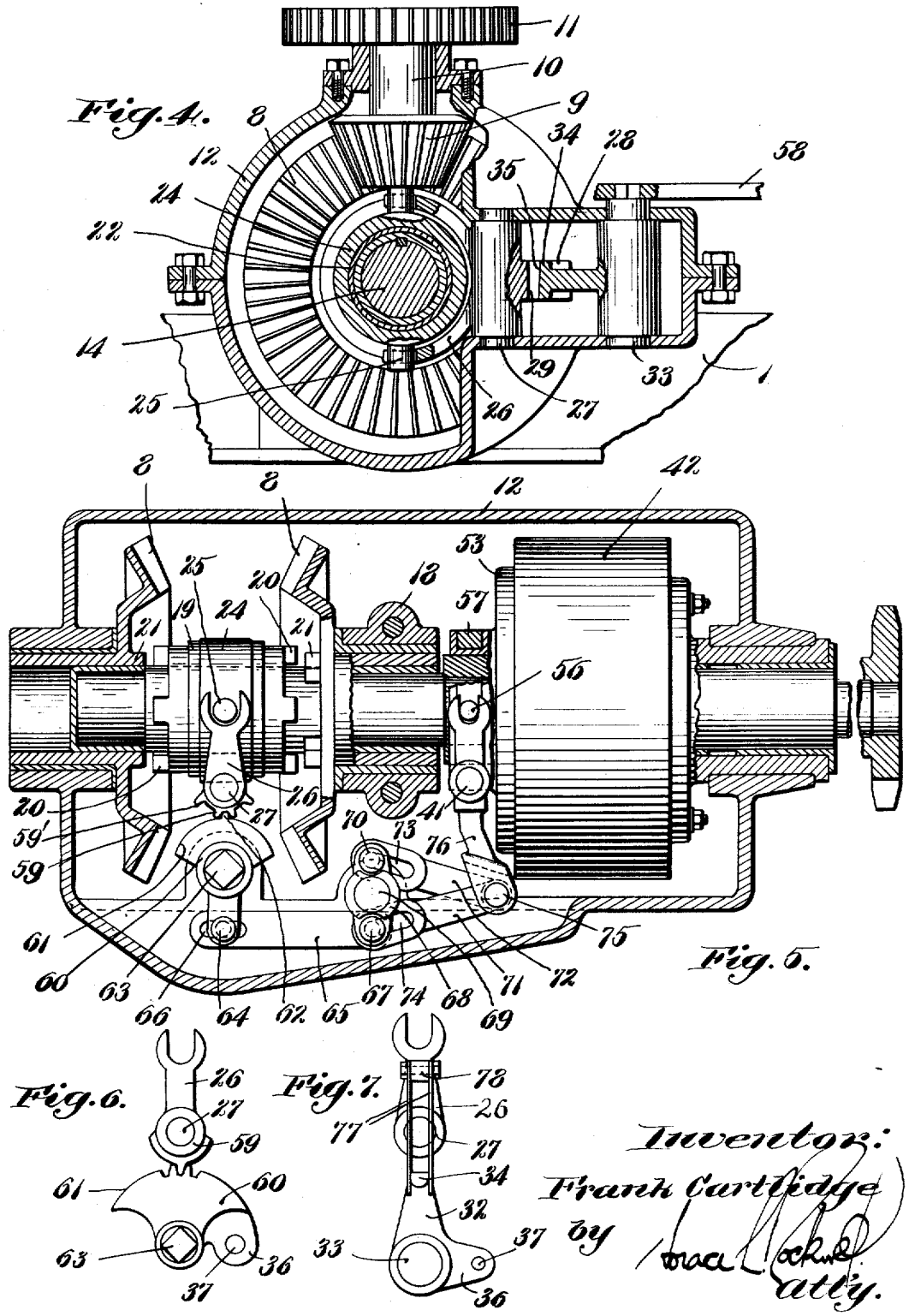

1,634,489

UNITED STATES PATENT OFFICE.

FRANK CARTLIDGE, OF CLAREMONT, NEW HAMPSHIRE, ASSIGNOR TO SULLIVAN MACHINERY COMPANY, A CORPORATION OF MASSACHUSETTS.

CLUTCH MECHANISM.

Application filed March 28, 1918. Serial No. 225,278.

My invention relates to clutch mechanisms.

It has for its object to provide an improved clutch mechanism and one which, while not necessarily limited thereto, is especially adapted to use in connection with trucks such as mining machine trucks or the like. A further object of my invention is to provide an improved clutch controlling mechanism whereby the parts may be controlled in an improved manner. These and other objects and advantages of my improved construction will, however, hereinafter more fully appear.

In the accompanying drawings I have shown for purposes of illustration two principal embodiments which my invention may assume in practice.

In these drawings,—

Fig. 1 is a side elevation of a mining machine truck equipped with my improvement.

Fig. 2 is a horizontal sectional view of the clutch mechanism therefor taken on line 2—2 of Fig. 1.

Fig. 3 is a vertical sectional view taken on line 3—3 of Fig. 2.

Fig. 4 is a vertical sectional view taken on line 4—4 of Fig. 2.

Fig. 5 is a horizontal sectional view, partially in plan, showing the clutch mechanism equipped with a modified form of controlling mechanism.

Fig. 6 is a detail view of a modified form of the interlocking mechanism shown in Fig. 5.

Fig. 7 is a detail view of a further modified form of interlocking mechanism.

In this illustrative construction, it will be observed that I have shown my improved mechanism carried upon a mining machine truck frame 1 which is in turn carried on wheels 2 adapted to run over the usual mine rails 3, the wheels 2 having their axles 4 connected by a drive chain 5 and being driven through a chain and sprocket connection 6 from a rear transverse shaft 7. As shown, this shaft 7 is, in turn, operatively connectable through improved mechanism hereinafter described, to either one of a plurality of spaced beveled gears 8 suitably journaled on the frame, as hereinafter described, and constantly meshing with a beveled gear 9 on the lower end of a vertical shaft 10 which is, itself, rotatable by the mining machine through a gear 11.

In my improved construction, it will be observed that the entire clutch mechanism is preferably enclosed in a suitable casing 12, adapted to be filled with oil. Into this casing, the shaft 7, which is journaled in a suitable bearing 13 is extended and disposed end to end with a supplemental or stub shaft 14. As shown, this shaft 14 itself extends coaxially through the rotatable beveled gears 8 and is journaled at its outer end in a bearing 15 formed on the casing, the shaft also being adjustable longitudinally by means of an adjustable thrust bearing 16. As illustrated, the gears 8, which are spaced apart on the shaft 14, are also provided with flanged sleeves 17 journaled in a suitable manner in bearings 18 on the bottom of the casing. Disposed between these gears 8, is also a movable clutch member 19 splined to the shaft 14 and adapted to be reciprocated longitudinally thereof in such a manner as to bring clutch teeth 20 on the opposite ends thereof alternately into engagement with cooperating clutch teeth 21 formed on the inner sides of the members 8, and thus connect either one or the other of the members 8 to the shaft 14. It will also be observed that this movable clutch member 19 is provided with an annular groove 22 having a flat bottom and inclined side walls 23 and housing within the same a correspondingly formed cam-ring or band 24, preferably formed of metal and adapted to cooperate with the inclined surfaces 23, as hereinafter brought out. This member 24 is in turn also provided with oppositely disposed pins 25 adapted to be engaged by an ordinary forked clutch shipper 26 pivoted at 27.

Operatively connected to this member 26 is the controlling means for shifting the member 19 back and forth and controlling the connection of the shafts 14 and 7. This means, as shown in Fig. 2, includes a rearwardly disposed bifurcated projection 28 carried on the member 26 and having a slot 29 between its portions and curved surfaces 30 and 31 on opposite sides of the same, the said surfaces preferably being struck from a different center and disposed as shown. Cooperating with this member 26 is a manually adjustable member 32, pivoted at 33 and having an upstanding portion 34, preferably provided with a curved surface 35 struck with the same radius as the surface 30 but from a different center. As shown in Fig. 2, this member 32 is in turn also provided with a crank 36 pivotally connected at 37 to a link connection 38 of adjustable length, which link connection is in its turn pivoted at 39 to a lever 40 which is pivoted at 41 and operatively connected to a suitable mechanism for operating a friction clutch, hereinafter described, the function of which is to control the connection of the shafts 7 and 14.

As shown, the shaft 7 has keyed thereto a friction housing member 42 having an internal bearing sleeve 43 and carrying a plurality of clutch disks 44 inside its periphery. As illustrated, the sleeve 43 of this member 42 is keyed at 45 to the shaft 7 and also carries a bearing sleeve 46 for a member 47 journaled on said bearing sleeve 46 and having a hub portion keyed to the adjacent end of the shaft 14. As illustrated, the member 47 is also operatively connected to a member 48 carrying clutch disks 49 adapted to cooperate with the disks 44. It will also be noted that one of these members 47 and 48, as for instance the member 48, is herein provided with a plurality of spaced lugs 50 adapted to cooperate with lugs 51 on the other member, herein the member 47, against the action of oppositely disposed coiled springs 52. Stops 50' are also provided to retain the springs in their operative relation and to transfer the thrust of lugs 51 to the lugs 50 after the springs have been compressed a predetermined distance. Thus, it will be observed that while the disks 44 and 49 may cooperate, the member 48 carrying the disks 49, is initially resiliently connected to the member 47 and the shaft 14, while the member 42 is directly and rigidly connected to the shaft 7, all in such a manner as to produce improved results hereinafter more fully brought out, when one of the sets of disks, as for instance the set of disks 49, is moved laterally relative to the other. This movement, as shown herein, is accomplished by means of a reciprocable actuating member 53 having an annular face 54 engageable with the outer disk and reciprocable relative to the hub of the member 47 on the shaft 14 when a clutch shipper 55, connected to the lever 40, is moved with the latter to engage suitable pins 56 carried on a collar 57 on the member 53.

In the operation of my improved construction, it will be evident that with the movable clutch member 19 in the neutral position in which the element 34 projects into the slot 29 as shown in Fig. 2, each of the gears 8 will rotate freely relative to the shaft 14, and neither of the same will impart rotation to that shaft or to the shaft 7. When, however, the controlling mechanism above described is operated, as for instance by means of an outer controlling lever 58 connected to the member 32, the member 19 is moved to the right or to the left, as desired, to connect one or the other of these members 8 to the shaft 14. When the arm 32 is moved to the right or left the element 34 which projects into the slot 29 will engage the sides of the latter to shift the clutch member 19. When the clutch engages the right hand gear 8 the radius of curvature of the curved surface 30 is such that the center will coincide with the center of oscillation of the arm 32 which arm is just long enough to have sliding engagement with said surface. Hence the element 34 after the clutch is engaged will be withdrawn from the slot 29 and will pass over the curved surface and any pressure between said surface and the element 34 will be substantially normal to the same. Thus it will be seen that the arm 32 is relieved of holding the clutch in engagement through manual force and further that the clutch is positively held against being disengaged. The operation is similar with the surface 31 when the clutch engages the left hand gear. For instance, let us assume that the controlling handle 58 is so moved that the right hand beveled gear 8 is connected to the shaft 14 in order to obtain this movement of the parts, it will be noted that the member 32 is thrown to the left in such a manner that this member, by reason of its cooperation with the surfaces 30 and 31 and the notch 29 on the rear end of the member 26, acts to hold the member 26 in its "in" position. Obviously, this movement of the member 32 will also cause a corresponding movement of the connections 38, 40, etc. in such a manner as to cause the member 53 to be reciprocated relative to the member 47, and thereby press the clutch disks 49 and 44 together to connect the two members 48 and 42 and the shafts 14 and 7. Conversely, when the controlling member 58 is turned in the reverse direction, the member 32 will be moved in a reverse direction, in such a manner as to reverse the movement of the member 26 and thereby cause the movable clutch member 19 to engage with the other beveled gear 8. In the movement of the clutch mechanism, however, from one position to another, it will be noted that the mechanism including the member 32 and its cooperating parts, constitutes an interlocking mechanism, which does not produce any movement of the member 53 into clutch operating position until after the member 19 has been moved into and locked in one of its extreme positions wherein it connects one of the gears 8 to the shaft 14. It will also be observed that this mechanism acts as an interlock effective to prevent the release of the clutch element 19 from either of these beveled gears prior to the release of the friction clutch. By the use of this interlocking controlling mechanism, it will also be noted that it is possible in any swinging position, by suitable limited movement of the lever 58, to vary the pressure upon the disks as desired, and thereby vary the speed from zero to the desired maximum without in any way affecting the clutch 20, 21 which controls the connection of the beveled gears 8 to the shaft 14. Attention is also directed to the fact that through the use of the beveled band 24 this member is enabled to act as a brake, when the member 26 is pressed to the right or left, in such a manner as to retard the member 19 and thereby cause the teeth thereof, through their slower travel, to be brought promptly into mesh with the cooperating teeth on the desired member 8. As for the provision of my improved resilient connections for one of the elements of the friction clutch, it will also be observed that this connection acts effectually as a cushion, tending to remove any shock from the disks or the teeth 20, 21 during the reversal of the parts, and thereby tends to reduce materially the wear and tear upon these clutch elements.

By the use of my improved construction, it will be observed that it is not only possible to produce a reversible driving mechanism, but that it is also possible to produce a reversible driving mechanism which is adapted to be used as a brake whenever desired, this being possible by moving the parts into reverse drive and using the friction clutch as a brake, at the same time that the wear upon the friction surfaces usually experienced when the truck is drifting is entirely eliminated. More specifically, it will be noted in connection with this point, that, since the shaft 14 and the disks connected thereto are, in my improved construction, freely rotatable, when the truck drifts, both shafts 14 and 7 and the clutch disks connected thereto tend to rotate as a unit without any relative rotation of such a character as to cause wear upon the disks. In my improved construction, it will also be observed that, due to the location of the friction clutch at one side of the gears, the size of this clutch is in no way restricted to the space between the gears, as has heretofore been the case, at the same time that it is made possible to eliminate any multiplication of speeds on the friction disks when the truck drifts. Attention is also directed to the fact that through my improved construction wherein an exteriorly located friction clutch is used, all tendency of the beveled gear members to skew in their bearings is effectually overcome, thus eliminating any possibility of the back lash of the gears affecting the friction clutch. It will also be noted that, through the use of my improved controlling mechanism, an exceedingly efficient control is obtained at the same time that it is possible to produce an exceedingly compact construction adapted to be housed in a suitable casing and preferably immersed in oil, in such a manner as to enable it to operate at the highest efficiency.

In Fig. 5 it will be noted that I have illustrated a modification of the controlling mechanism described above in connection with Fig. 2. In this modified construction, the controlling mechanism, however, operates upon the same principle as the controlling mechanism hereinabove described, the same differing therefrom only in detail. More specifically, it will be observed that instead of providing a bifurcated portion upon the end of the member 26, the latter is provided with an arcuate end having a plurality of adjacent teeth 59 disposed substantially midway between its ends and a plurality of spaced teeth 59' disposed at its ends. It will also be observed that cooperating with these teeth is a pivoted member 60 corresponding in general to the member 32 but having an arcuate or cam face 61 provided with a central tooth 62 adapted intermittently to engage the interval between the teeth 59. It will also be observed that the member 60 is pivoted at 63 and pivotally connected, as by a pin 64, to a rearwardly disposed reciprocable link 65, through a slotted connection 66 in that link. Attention is also directed to the fact that this link 65 is in turn pivotally connected through a pin 67 to a member 68 pivoted on a pivot 69 and itself pivotally connected through its pivots 67 and 70 to a pair of links 71, 72 having slots 73, 74 at one of their ends, whereby freedom of movement in one direction is given to the pivots 67, 70, and having their opposite ends pivotally connected on the same pivot 75 to a clutch operating member 76 corresponding to the lever 40. As a result of this construction, it will be observed that the same general results are obtained as described above in connection with the mechanism shown in Fig. 2.

Attention is also directed to the fact that in Fig. 6 I have illustrated a further modified form of the interlocking mechanism, wherein the arrangement of the teeth on the members 26 and 60 is reversed, the single tooth being carried on the member 26, while a plurality of adjacent teeth is provided upon the member 60, the latter in this case, however, also being provided with the arcuate surface 61 so that it may cooperate in its different angular positions to hold the member 59 in its desired position. It will also be noted that I have shown in Fig. 7 a further modified form of this interlocking mechanism, utilizing in this figure a construction which is quite similar to the interlocking mechanism shown in Fig. 2. However, in this form it will be noted that in lieu of the connections between the member 32 and the member 26 including the bifurcated portion 28, I have fixed a plurality of spaced, horizontally disposed springs 77 to the member 26, as at a point 78 in front of the pivot 27 thereof, and extended these springs back beyond the pivot so that they may cooperate with the upstanding portion 34 on the member 32. Obviously, the operation of the mechanism will, however, be the same as that above described.

While I have in this application specifically described two principal embodiments which my invention may assume in practice, it is to be understood that the invention may be modified and embodied in various other forms without departing from its spirit or the scope of the appended claims.

What I claim as new and desire to secure by Letters Patent is:

1. In a clutch mechanism, a positive clutch, a friction clutch, means for transmitting power through one to the other including constantly meshing gearing, longitudinally stationary shafts upon which the same are mounted, and interlocking controlling mechanism between said clutches operable to vary the pressure of said friction clutch without varying the connection of said positive clutch and to lock said positive clutch against disengagement.

2. In a clutch mechanism, a positive clutch including a rotatable element and a reciprocable cooperating element, a braking means on said reciprocable element operative to produce a braking force having a component passing substantially radially through said reciprocable element, and means for applying said brake to produce a braking force on said reciprocable element.

3. In a clutch mechanism, positive clutch mechanism including a rotatable and a reciprocable element, a braking member having an inclined surface engageable with a similar surface on said reciprocable element, and clutch shipping means connected to said member to operate the same during abnormal operation of the clutch.

4. In a clutch mechanism, a reversible positive clutch including a plurality of rotatable elements and an element reciprocable between the same, a braking member on said reciprocable element, and means for automatically applying said brake upon abnormal operation of said element.

5. In a clutch mechanism, a positive clutch including a driving and a driven element, one reciprocable relative to the other, and means including a brake member carried on one of said elements having a surface engageable with said element to produce a braking action during abnormal operation thereof for bringing said elements promptly into mesh.

6. In a clutch mechanism, a reversible driving shaft, clutch mechanism disposed wholly coaxial to said shaft operative to effect rotation thereof in either direction and the connection of said shaft with a source of power, a driven shaft coaxial with said driving shaft, a clutch mechanism controlling the connection of said shafts, controlling mechanism for the first mentioned clutch mechanism including a clutch shipping yoke, and interlocking means for said clutches including means carried by said yoke to lock one of said clutches in engagement and while locked to permit varying of the power transmitted therethrough with the other clutch.

7. In a transmission mechanism, alined driving and driven shafts, power driven gears rotating in opposite directions loosely on said first mentioned shaft, clutch mechanism for connecting either of said gears to said driving shaft to cause rotation of the latter in either direction at the same angular rate, a friction clutch mechanism for connecting said driving and driven shafts, and clutch operating means including a pivoted member having a plurality of projections for said several clutches operative on initial clutch engaging movement to move to operating position one of said clutch mechanisms and to lock it therein and while so locked to move further to cause operative engagement of the other thereof.

8. In a transmission mechanism, alined driving and driven shafts, power driven gears rotating in opposite directions loosely on said first mentioned shaft, clutch mechanism for connecting either of said gears to said driving shaft to cause rotation of the latter in either direction, a friction clutch mechanism for connecting said driving and driven shafts, and clutch operating means including a plurality of cooperating members one of which has a plurality of projections and the other a lesser number of projections for said several clutches operative on initial movement to operate said first mentioned clutch mechanism to engage one of said gears with said shaft and to lock said clutch mechanism in such position and on further movement to cause operative engagement of the other of said clutch mechanisms.

9. In a clutch mechanism, a counter driving shaft, a pair of gears coaxial thereto, clutch mechanism for connecting one of said gears to said shaft to effect rotation thereof in one direction and to connect the other of said gears to said shaft to effect rotation thereof in the opposite direction, a driven shaft in alinement with said counter driving shaft, clutch mechanism thereon for connecting said shafts, and interlocking mechanism between said clutch mechanisms comprising means whereby said clutch mechanism for said gears is locked in position while permitting manipulation of the other clutch.

10. In a clutch mechanism, a counter driving shaft, a pair of gears coaxial thereto, clutch mechanism for connecting one of said gears to said shaft to effect rotation thereof in one direction and to connect the other of said gears to said shaft to effect rotation thereof in the opposite direction, a driven shaft in alinement with said counter driving shaft, clutch mechanism thereon for connecting said shafts, interlocking mechanism between said clutch mechanisms comprising means whereby said clutch mechanism for said gears is locked in position while permitting manipulation of the other clutch, and a common manually operable control lever movable in a single plane to effect operation of both of said clutches.

In testimony whereof I affix my signature.

FRANK CARTLIDGE.

nism between said clutch mechanisms comprising means whereby said clutch mechanism for said gears is locked in position while permitting manipulation of the other clutch.

10. In a clutch mechanism, a counter driving shaft, a pair of gears coaxial thereto, clutch mechanism for connecting one of said gears to said shaft to effect rotation thereof in one direction and to connect the other of said gears to said shaft to effect rotation thereof in the opposite direction, a driven shaft in alinement with said counter driving shaft, clutch mechanism thereon for connecting said shafts, interlocking mechanism between said clutch mechanisms comprising means whereby said clutch mechanism for said gears is locked in position while permitting manipulation of the other clutch, and a common manually operable control lever movable in a single plane to effect operation of both of said clutches.

In testimony whereof I affix my signature.

FRANK CARTLIDGE.

Certificate of Correction.

Patent No. 1,634,489.     Granted July 5, 1927, to

FRANK CARTLIDGE.

It is hereby certified that error appears in the printed specification of the above-numbered patent requiring correction as follows: Page 2, line 100, for the numeral and word " 14 in " read *14. In;* and that the said Letters Patent should be read with this correction therein that the same may conform to the record of the case in the Patent Office.

Signed and sealed this 11th day of October, A. D. 1927.

[SEAL.]     M. J. MOORE,

*Acting Commissioner of Patents.*

Certificate of Correction.

Patent No. 1,634,489. Granted July 5, 1927, to

FRANK CARTLIDGE.

It is hereby certified that error appears in the printed specification of the above-numbered patent requiring correction as follows: Page 2, line 100, for the numeral and word " 14 in " read *14. In;* and that the said Letters Patent should be read with this correction therein that the same may conform to the record of the case in the Patent Office.

Signed and sealed this 11th day of October, A. D. 1927.

[SEAL.]
M. J. MOORE,
*Acting Commissioner of Patents.*